United States Patent
Richmond

[11] Patent Number: 5,363,104
[45] Date of Patent: Nov. 8, 1994

[54] JAMMING SIGNAL CANCELLATION SYSTEM

[75] Inventor: Martin R. Richmond, Lexington, Mass.

[73] Assignee: Lockheed Sanders, Inc., Nashua, N.H.

[21] Appl. No.: 509,158

[22] Filed: Sep. 24, 1974

Related U.S. Application Data

[63] Continuation-in-part of Ser. No. 448,430, Feb. 28, 1974, abandoned.

[51] Int. Cl.⁵ .......................... G01S 7/36; H04K 3/00
[52] U.S. Cl. ................................. 342/17; 342/19; 342/381; 342/384
[58] Field of Search ............. 343/18 E; 325/473-475; 342/16, 17, 18, 19, 92, 379, 381, 384

[56] References Cited

U.S. PATENT DOCUMENTS

| | | | |
|---|---|---|---|
| 3,938,149 | 2/1976 | Grantham | 342/94 |
| 3,947,848 | 3/1976 | Carnahan et al. | 342/16 |
| 4,010,469 | 3/1977 | Marcum | 342/16 |
| 4,215,344 | 7/1980 | Phillips, Jr. | 342/17 |
| 4,224,622 | 9/1980 | Schmidt | 342/78 |
| 4,358,766 | 11/1982 | Mehron | 342/18 |
| 4,586,048 | 4/1986 | Downie | 342/379 |
| 4,628,320 | 12/1986 | Downie | 342/16 |
| 4,689,628 | 8/1987 | Lewis | 342/384 |
| 4,757,265 | 7/1988 | Peacher | 342/17 X |
| 4,851,847 | 7/1989 | Clarkson | 342/17 |
| 4,992,793 | 2/1991 | Dibrell et al. | 342/16 |
| 5,049,890 | 9/1991 | Hansen | 342/384 |
| 5,291,209 | 3/1994 | Evans et al. | 342/381 |

*Primary Examiner*—John B. Sotomayor
*Attorney, Agent, or Firm*—David W. Gomes

[57] ABSTRACT

Improved radar system performance in a jamming environment is achieved by detecting the AM difference frequency produced by the beating of the desired radar signal with the jamming signal and applying same to one input of a balanced modulator while simultaneously applying the received signal (containing both the desired radar signal and the jamming signal) to the other input of the balanced modulator whereby the output from the balanced modulator contains the desired signal but not the jamming signal.

16 Claims, 1 Drawing Sheet

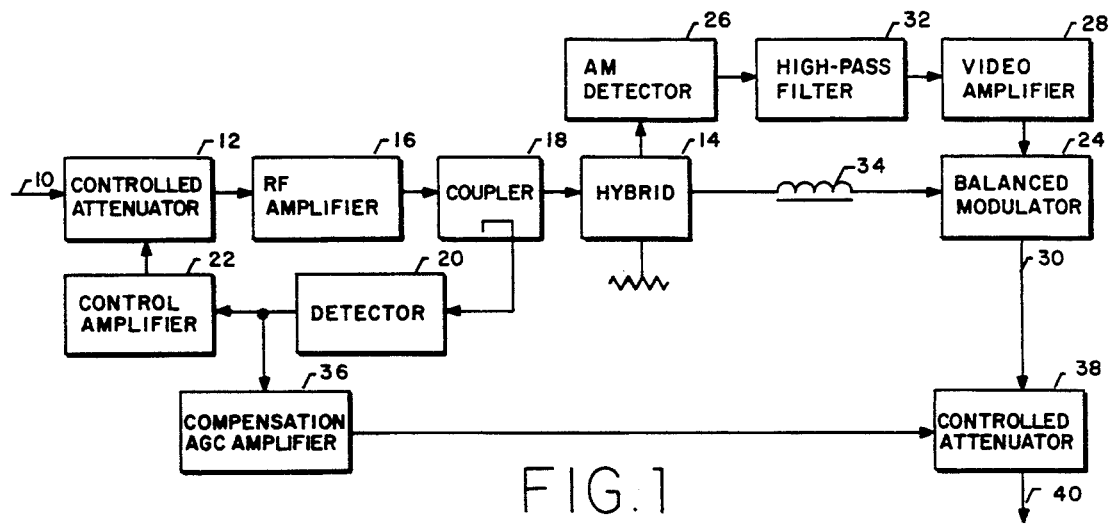
FIG.1
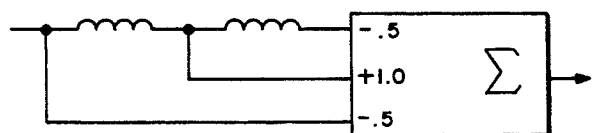
FIG.2A
FIG.2B
FIG.2C
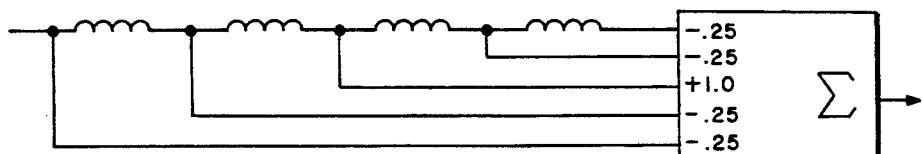
FIG.3A
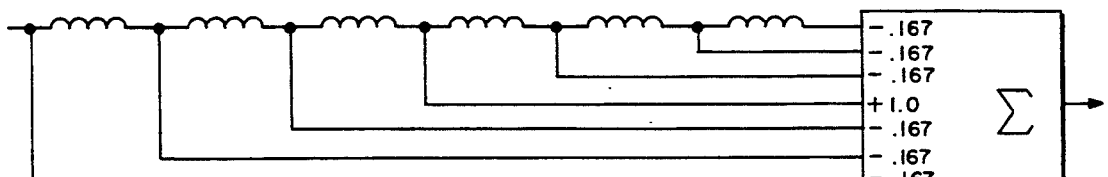
FIG.3B
FIG.3C

JAMMING SIGNAL CANCELLATION SYSTEM

This application is a continuation-in-part of my application Ser. No. 448,430, filed Feb. 28, 1974, now abandoned.

BACKGROUND OF THE INVENTION

An important consideration in the design of radar systems, particularly those for military applications, is the provision of means for recovering radar signals from a total signal which includes noise jamming signals of higher intensity than that of the radar signal itself. Most noise jammers consist of an oscillator which is frequency modulated by a noisy waveform at high rates. The rates are high enough to shock-excite the victim radar i.f. amplifier so that its output is indistinguishable from the random noise.

Many techniques have been used to attempt to eliminate the effects of such jamming signals, for example, side-lobe cancellers and the so-called Dicke Fix.

Side-lobe cancellers reduce interference in antenna side-lobes while not improving any interference in the main lobe. The side-lobe cancellers are also relatively costly since extensive modifications must be made to a radar installation including the addition of another antenna and receiver.

The Dicke Fix is used to reduce degradation in the radar display, however, the jam to signal (J/S) ratio is not improved.

SUMMARY OF THE INVENTION

Accordingly, it is an object of this invention to provide improved means for reducing the effects of "noise" jamming on radar.

It is another object of this invention to provide a radar system having improved S/J ratio.

It is a further object of this invention to provide improved radar performance in a jamming environment over all aspect angles.

An anti-jamming radar having very high jamming rejection even in the main beam is provided inexpensively. No antenna modification is necessary nor is the equipment critical to adjust. The technique works with all types of radar waveforms. Briefly, the signal received at a radar antenna, which consists of a desired radar signal and a higher intensity jamming signal, is amplitude standardized by, for example, conventional AGC techniques, and split into two channels. The first channel includes an AM detector, a high-pass filter and a video amplifier. The AM detector detects the difference frequency produced by the beating of the desired radar signal with the jamming signal. The second channel may include a delay line. The outputs from the delay line and video amplifier are coupled to respective inputs of a balanced modulator whose output contains the desired signal and its image, but not the jamming signal.

BRIEF DESCRIPTION OF THE DRAWINGS

The above-mentioned and other features and objects of this invention will become more apparent by reference to the following description taken in conjunction with the accompanying drawings, in which:

FIG. 1 is a block diagram of the invention;

FIGS. 2A–2C are spectrum diagrams illustrating operation of the system of FIG. 1; and FIGS. 3A–3C are representative filters employed in the embodiment of FIG. 1.

DESCRIPTION OF PREFERRED EMBODIMENTS

Noise jammers generate a signal which is essentially a constant amplitude FM signal and accordingly improvement, modification and extension of the techniques suggest in U.S. Pat. No. 3,605,018 for radio communication systems can be used to suppress FM jamming and extract radio signals of most types: pulse, chirp, phase-coded, etc.

A system for reducing the effects of "noise" jamming on a radar is shown in FIG. 1. The system is inserted in front of the conventional radar receiver and may be operated either at the radar r.f. or, by translation and re-translation, at a convenient i.f.

The input signal at line 10 is applied to a controlled attenuator 12 such as a p-i-n diode attenuator. The output from attenuator 12 is applied to a hybrid 14 via an RF amplifier 16 and coupler 18. Part of the signal from coupler 18 is applied to a diode detector 20, and via a control amplifier 22 used to control the controlled attenuator 12. The elements 12, 1,6, 18, 20 and 22 constitute an AGC circuit which amplitude standardizes the input to hybrid 14.

The signal at hybrid 14 which can be any suitable signal power splitter is divided into two paths. One path drives a balanced modulator 24, the other 25 an AM detector 26. If the input signal is only a jammer signal (constant amplitude noisy-FM) there will be no AM and the output from balanced modulator 24 will be zero. When a target signal is present it beats with the jammer signal, producing AM at the difference frequency.

This AM signal is detected by AM detector 26, filtered, amplified by video amplifier 28 and applied to another input of balanced modulator 24. The video signal, applied to the balanced modulator causes double-sideband suppressed-carrier modulation of the jamming signal. As a result the balanced modulator output taken at line 30 contains two frequencies: one is the desired signal; the other is an image on the other side of the jamming frequency and frequency modulated with twice the deviation of the jammer. This other signal for the most part will be out of the radar receiver passband and therefore, of no consequence.

A high-pass filter 32 is employed to block d.c. so that the jamming signal cannot push itself through. A delay line 34 is used to match the delay in the video amplifier 28. The r.f. input to balanced modulator 24 is the stronger signal which switches the diodes; the video input is the weak signal which controls the output amplitude (and polarity).

The signals occurring in the system of FIG. 1 are illustrated in the spectrum drawings of FIGS. 2A–2C. The input spectrum at line 10 comprises the desired signal S and the FM jamming signal J. The detected beat frequency is illustrated in FIG. 2B and the output 30 from the balanced modulator is illustrated in FIG. 2C.

The AGC circuit restricts the dynamic range of signals presented to the balanced modulator permitting a better balance to be maintained. It need not be very tight, for example, the level need not be held any closer than several dB. Also, the AGC need not be particularly fast, even to handle jammers with AM. An AGC compensation amplifier 36 is used to control the output signal 30 from balanced modulator 24 via a second controlled attenuator 38 to restore the antenna pattern modulation lost by the AGC processing.

For pure FM jammers high-pass filter 22 need only block d.c. and low frequency fluctuations due to the radar antenna pattern. A cutoff frequency on the order of 1 KHz will generally suffice. A simple RC filter can be employed. On the other hand, to handle jammers which may have AM at frequencies up to 5 or 10 MHz, the high-pass filter 22 should cut off at 5 or 10 MHz. This will cause some loss in the desired signal since, whenever the beat frequency is below the filter cutoff, the signal will not get through. However, generally this loss is small. For example, if the jammer bandwidth is 100 MHz and has modulation rates up to 10 MHz, the signal will be rejected 20% of the time, a 2 dB loss.

The above discussion is somewhat simplified. More precisely, the desired signal is attenuated not only by the effect of the amplitude v/s. frequency response; the phase distortion in the passband is also deleterious. In this respect elliptic filters may be advantageous because of their wide linear phase. Transversal filters of the type shown in FIGS. 3A–3C have been found particularly efficient. One way of understanding their advantage is to observe that their time response is bounded and they therefore do not ring a long time after transient excitation. This type of filter has been used in MTI radars to cancel clutter. The side tap coupling values may be tapered instead of uniform as shown.

The improvement factor obtained is not limited by the degree of balance of the balanced modulator. If the detector-video amplifier loop has a net gain, the improvement factor is increased by this gain. Of course, the amount of net gain that can be used is limited by the minimum J/S ratio to be expected. But it is the broadband J/S ratio that figures in this limitation and not the in-band J/S ratio, and so it is not much of a limitation.

An example will make this clear. Consider the following set of parameters:

| | |
|---|---|
| Jammer bandwidth | 100 MHz |
| Radar receiver bandwidth | 1 MHz |
| Modulator unbalance | −40 dB |
| Minimum in-band J/S | 0 dB |
| Max. video input to modulator | 10 dB below r.f. drive |

The minimum broadband J/S will be 20 dB. The maximum usable net gain will be 10 dB. Therefore, the improvement factor will be 40+10−6=44 dB (The 6 dB loss is due to sideband splitting.).

This technique does not require the two branches of the circuit to be matched in r.f. delay to within a few degrees. (There is, of course, such a requirement inside the balanced modulator). The delay through the two branches need only be matched well enough so that the video applied to the modulator agrees with the instantaneous frequency difference in the r.f. drive. The tolerance on this match is on the order of half the radar receiver bandwidth. Thus, using 100 MHz jammer bandwidth with an average modulation frequency of 5 MHz, the average slope is 1600 MHz/$\mu$s. If the receiver bandwidth is 1 MHz (typical pulse radar), the delays must be matched to within about 0.3 ns.

In addition to the radar use described hereinbefore the invention is also useful in ECM applications. Conventionally an ECM jammer is periodically shut off so that an ESM receiver can look at the radar which is being jammed to see if it is still operating at the jamming frequency or at a different frequency, thus, requiring shift in the jamming frequency. During this period the jammer aircraft is vulnerable since the radar is permitted a clear look.

The present invention can be employed with such ESM receiver and, thus, eliminate the requirement of shutting off the jammer to accomplish look-through. In fact, continuous look-through can be achieved with a continuous monitoring of the radar frequency.

While I have described above the principles of my invention in connection with specific apparatus, it is to be clearly understood that the specification is presented by way of example and not as a limitation of the scope of my invention, as set forth in the accompanying claims.

I claim:

1. In a radar system, apparatus for recovering desired radar signals from an input signal which includes noise jamming signals of higher intensity, comprising:
   a balanced modulator;
   means for applying a portion of the input signal to one input of said balanced modulator;
   means for detecting the difference frequency produced by the beating of the desired signal with the jamming signal; and
   means for applying said detected signal to a second input of said balanced modulator whereby the output of said balanced modulator will contain the desired signal but not the jamming signal.

2. Apparatus as defined in claim 1, further including a video amplifier coupling said detecting means to said second input of said balanced modulator.

3. Apparatus as defined in claim 2, further including a high-pass filter coupling said detecting means to said video amplifier.

4. Apparatus as defined in claim 3,
   wherein said high-pass filter has a cutoff frequency sufficiently high to reject any AM on the jamming signal.

5. Apparatus as defined in claim 3, further including compensating means for equalizing the phase of the signals applied to said balanced modulator.

6. Apparatus as defined in claim 5, wherein said compensating means includes a delay means coupling said input signal to said one input of said balanced modulator.

7. Apparatus as defined in claim 1, further including means for amplitude standardizing the input signal.

8. Apparatus as defined in claim 7, wherein said amplitude standardizing means includes an AGC circuit.

9. Apparatus for receiving noncooperative radar signals proximate an active transmitter which is generating noise jamming signals of higher intensity, comprising:
   a balanced modulator;
   means for applying a portion of the received signal including the radar signals and noise jamming signals to one input of said balanced modulator;
   means for detecting the difference frequency produced by the beating of the radar signal with the jamming signal; and
   means for applying said detected signal to a second input of said balanced modulator whereby the output of said balanced modulator will contain the radar signal but not the jamming signal.

10. Apparatus as defined in claim 9, further including a video amplifier coupling said detecting means to said second input of said balanced modulator.

11. Apparatus as defined in claim 10, further including a high-pass filter coupling said detecting means to said video amplifier.

12. Apparatus as defined in claim 11, wherein said high-pass filter has a cutoff frequency sufficiently high to reject any AM on the jamming signal.

13. Apparatus as defined in claim 11, further including compensating means for equalizing the phase of the signals applied to said balanced modulator.

14. Apparatus as defined in claim 13, wherein said compensating means includes a delay means coupling said received signal to said one input of said balanced modulator.

15. Apparatus as defined in claim 9, further including means for amplitude standardizing the received signal.

16. Apparatus as defined in claim 15, wherein said amplitude standardizing means includes an AGC circuit.

* * * * *